United States Patent
Tavor

[11] Patent Number: 5,603,352
[45] Date of Patent: Feb. 18, 1997

[54] FLUID FLOW CONTROL DEVICE INCLUDING MULTIPLE VALVE UNITS

[75] Inventor: Elhanan Tavor, Carmiel, Israel

[73] Assignee: C. Valves Ltd., Hazor Haglilit, Israel

[21] Appl. No.: 345,434

[22] Filed: Nov. 21, 1994

[51] Int. Cl.[6] .................................................. F16K 27/00
[52] U.S. Cl. ...................... 137/599.1; 137/594; 251/63.5
[58] Field of Search .................................... 137/599, 601, 137/599.1, 594; 251/63.5

[56] References Cited

U.S. PATENT DOCUMENTS

| | | |
|---|---|---|
| 2,071,969 | 2/1937 | Diescher . |
| 2,577,851 | 12/1951 | Hribar . |
| 2,608,204 | 8/1952 | Dunn . |
| 3,113,583 | 12/1963 | Fox . |
| 3,134,394 | 5/1964 | Ohta . |
| 3,156,253 | 11/1964 | Marderness . |
| 3,297,047 | 1/1967 | Sime . |
| 3,359,997 | 12/1967 | Gardey . |
| 3,399,689 | 9/1968 | Keane . |
| 3,502,105 | 3/1970 | Ernyei et al. ............................ 137/599 |
| 3,515,165 | 6/1970 | Zadoo . |
| 3,587,622 | 6/1971 | Hardison . |
| 3,942,553 | 3/1976 | Gallatin ................................... 137/599 |
| 3,945,393 | 3/1976 | Teatini . |
| 4,019,533 | 4/1977 | Jerde et al. ............................. 137/599 |
| 4,077,425 | 3/1978 | Drori . |
| 4,112,965 | 9/1978 | Kruschik . |
| 4,354,712 | 10/1982 | Reinhartz et al. . |
| 4,373,544 | 2/1983 | Goodman et al. . |
| 4,681,130 | 7/1987 | Tabor . |
| 4,747,426 | 5/1988 | Weevers . |
| 4,768,544 | 9/1988 | Beam et al. ......................... 137/599 X |
| 4,911,196 | 3/1990 | Kemp . |
| 5,048,564 | 9/1991 | Gaiardo ................................... 137/599 |

FOREIGN PATENT DOCUMENTS

| | | |
|---|---|---|
| 75895 | 7/1985 | Israel . |
| 80096 | 11/1994 | Israel . |
| 2057638 | 4/1981 | United Kingdom . |
| 2066427 | 7/1981 | United Kingdom . |

Primary Examiner—Stephen M. Hepperle
Attorney, Agent, or Firm—Cushman, Darby & Cushman IP Group of Pillsbury Madison & Sutro LLP

[57] ABSTRACT

A fluid flow control device comprising a housing, an inlet at one side of the housing and an outlet at its other side, and externally-controlled valve means installed within the housing for controlling the flow of the fluid therethrough, characterized in that the interior of the housing is divided into at least two compartments, each having an inlet port and an externally-controlled valve within the compartment for controlling the passage of fluid through the respective inlet port, at least one of the valves being adapted to control the fluid flow through the housing in the direction from the inlet to the outlet thereof.

20 Claims, 13 Drawing Sheets

FLUID FLOW CONTROL DEVICE INCLUDING MULTIPLE VALVE UNITS

FIELD AND BACKGROUND OF THE INVENTION

The present invention relates to fluid control valves, and more particularly to hydraulically controlled valves. Still more specifically the invention concerns an improved mode of installation and application of valves assembled in and operating as a group within a common, integral housing, all as will become evident from the detailed description hereinbelow.

While the device according to the present invention may be operated using most any type of known valves, it is most advantageous to employ—and the invention will be exemplified with specific reference to—valves as disclosed in my prior U.S. Pat. No. 4,681,130.

In the art of fluid flow control—in particular with regard to water irrigation installations—there arises the need for larger diameter control valves, say of 4" or more. Valves of such sizes are rather expensive, since even under normal network pressures, the forces that the valve parts and components must withstand are great, sometimes beyond the mechanical strength of synthetic materials such as plastic, from which they are usually made.

Furthermore, from the reliability point of view, if a failure occurs in a single, large-size valve and it becomes inoperative—the entire line is put out of service.

These considerations have led to the approach, lying at the base of the present invention, to substitute singular large-size valves by a combination or a battery of small-size valves that will yield a less expensive article of manufacture and of a more reliable operation, and—not less important—will achieve a series of further goals, as follows.

It sometimes happens that a single, main line is feeding a number of consumers, say different plots of the same piece of land. In such cases, it is customary to provide the main line with a common manifold and tap-off a number of branches leading to the different plots, each with its individual control valve.

BRIEF SUMMARY OF THE PRESENT INVENTION

The multiple-valve unit proposed according to one aspect of the present invention will save the extra piping by serving the number of plots through a single branch via the proposed control device.

An even more striking example of the unique advantage of the invention is found in the field of irrigation filter installations. As known, filters with back-flow rinsing facilities must include at least one forward-flow feeding control valve, and one reverse-flow, flushing valve.

Thus the multiple-valve device according to another aspect of the invention provides a most convenient, effective and inexpensive solution, where the individual valves of the device are installed in combinations of forward- and backward-oriented operative directions, as will become clear in the light of the following description.

According to one broad aspect of the present invention, there is provided a fluid flow control device, comprising: a casing; an inlet flange secured to one end of the casing and including an inlet port; an outlet flange secured to the opposite end of the casing and including an outlet port; a valve-seat plate secured between the inlet flange and the casing and formed with a plurality of valve seats each defining a valve opening leading into the interior of the casing; a plurality of partition members within the casing and engageable with inner surfaces thereof to divide the interior of the casing into a plurality of separate compartments including one compartment communicating with each of the valve openings; and a valve within each of the compartments communicating with a the valve opening, each valve including a valve member movable towards and away from the valve seat of the respective compartment to control the flow of fluid therethrough.

According to further features in the preferred embodiments of the invention described below, the casing is of cylindrical configuration, and the partition members extend radially within the cylindrical casing to define a plurality of compartments each having the cross-section of a sector of a circle. In the described preferred embodiments, there are two partition members disposed perpendicularly to each other, each having a width equal to the inner diameter of the cylindrical casing and a length equal to the length of the cylindrical casing, to thereby divide the interior of the cylindrical casing into four compartments.

In some described embodiments, the valve-seat plate completely covers the respective end of the casing and includes a valve seat defining a valve opening for each of the compartments. In other described embodiments, the valve-seat plate covers only a part of the respective end of the casing and includes a valve seat defining a valve opening for each covered compartment, but leaves at least one of the compartments uncovered.

In the latter embodiments, the so-covered compartments are used for housing forward-flow valves, whereas the uncovered compartments are used for housing reverse-flow valves.

BRIEF DESCRIPTION OF THE DRAWINGS

Further details of construction and advantages of the invention will become more clearly-understood in light of the description below of a few preferred embodiments of the invention, given by way of example only, with reference to the accompanying drawings, wherein.

DESCRIPTION OF PREFERRED EMBODIMENTS

Figure 1:
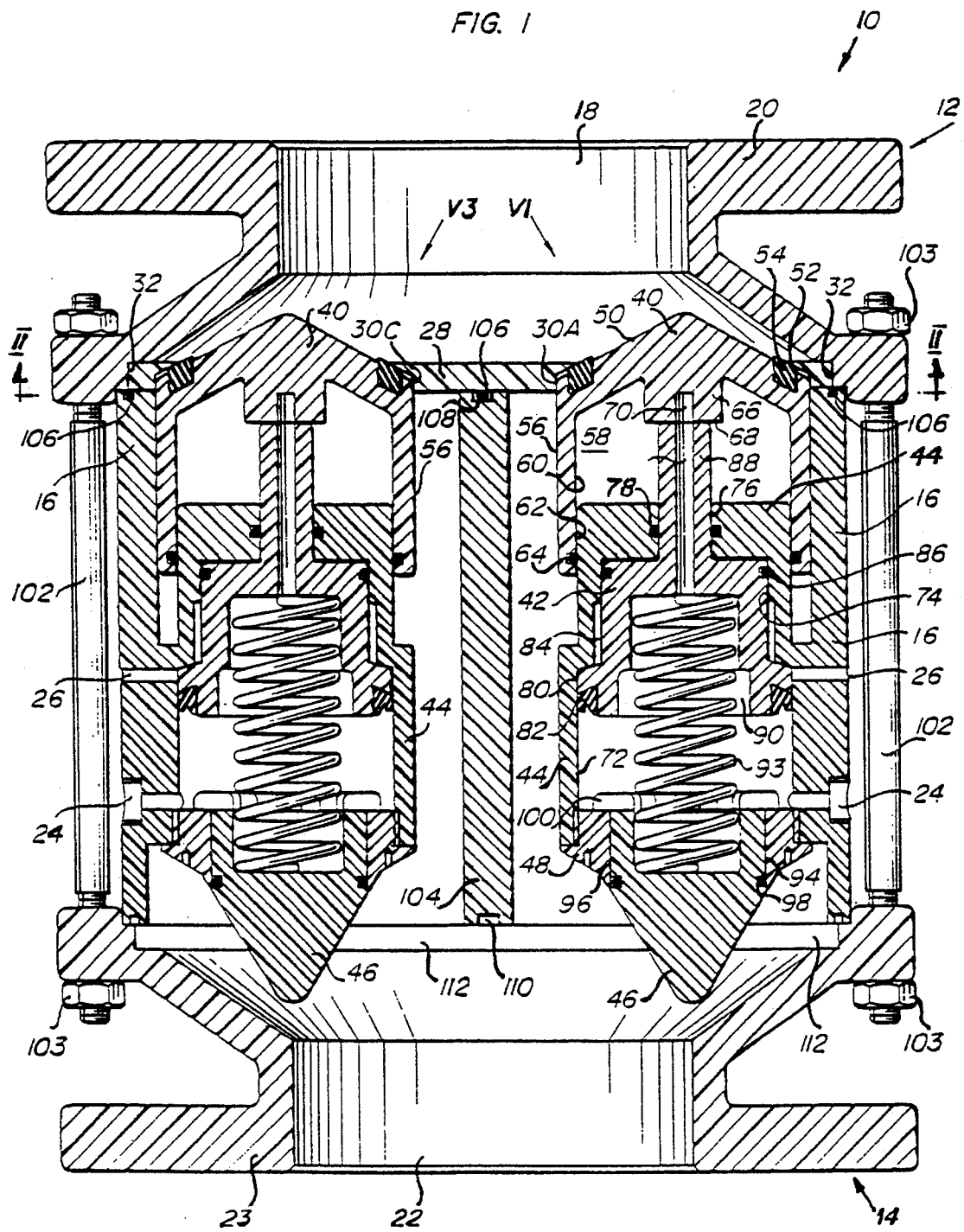
FIG. 1 is a longitudinal cross-section of the flow-control device comprising four valve units, in the closed position.

Generally, device 10 of FIG. 1 includes three major housing components, namely inlet port flange generally denoted 12, outlet port flange 14, and valves casing 16 fitting between the two flanges and forming together the complete, self-contained valves housing structure for housing four valves V1, V2, V3, V4.

In further detail, flange 12 comprises an inlet 18 with a rim 20 for directly installing the device to a fluid pipeline (not shown).

The outlet flange 14 comprises an outlet opening 22, connectable by rim 23 to the installation downstream of the device (not shown).

The casing 16 is provided for each valve with a passageway 24 for introducing pressurized fluid control commands from a hydraulic control device (not shown) into the respective one of valves V1, V2, V3 and V4. A drain passage 26 for each valve is also provided as shown. The casing 16 further includes—integrally moulded therewith—a partition assembly which will be described in greater detail below for valve V1 (which applies also to valves V2–V4) each valve V1–V4 is the same as of the in-line valve disclosed in U.S. Pat. No. 4,681,130 as above-mentioned, and therefore identical reference numerals have been used; its main components are as follows: Valve member 40; a first, slidable piston member 42; a first, fixed cylinder 44, which is integrally moulded with the casing 16; a second, slidable piston 46; and a second, fixed cylinder 48—all being in axial alignment with respect to each other along the flow direction between the inlet 18 and the outlet 22.

Clamped between the inlet flange 12 and the casing 16 is a circular valve seat plate 28 formed with—in this case—valve seats defining four valves four openings 30A, 30B, 30C and 30D—one for each of valves V1–V4, respectively. The plate 28 is of circular configuration and fits into a circular cavity or depression 32 formed in the inlet flange 12 to completely cover the upper end of casing 16.

Valve member 40 is generally cup-shaped having a streamlined, bullet-like end surface 50 facing the incoming fluid flow through the inlet 18. The plate 28 is provided with a valve seat surface 52, configured to fit against a valve ring or gasket 54 of the valve 40, as shown. Cylindrical wall portion 56 of the valve 40 extends backwards in the downstream direction, defining a hollow space 58 thereinside. Inner surface 60 is slidably guided around an outer portion 62 of the fixed cylinder 44, with a suitable seal in the form of O-ring 64.

Valve V1 further comprises a central projection 66 defining an abutment surface 68, and an inner hollow space 70.

Figure 3:
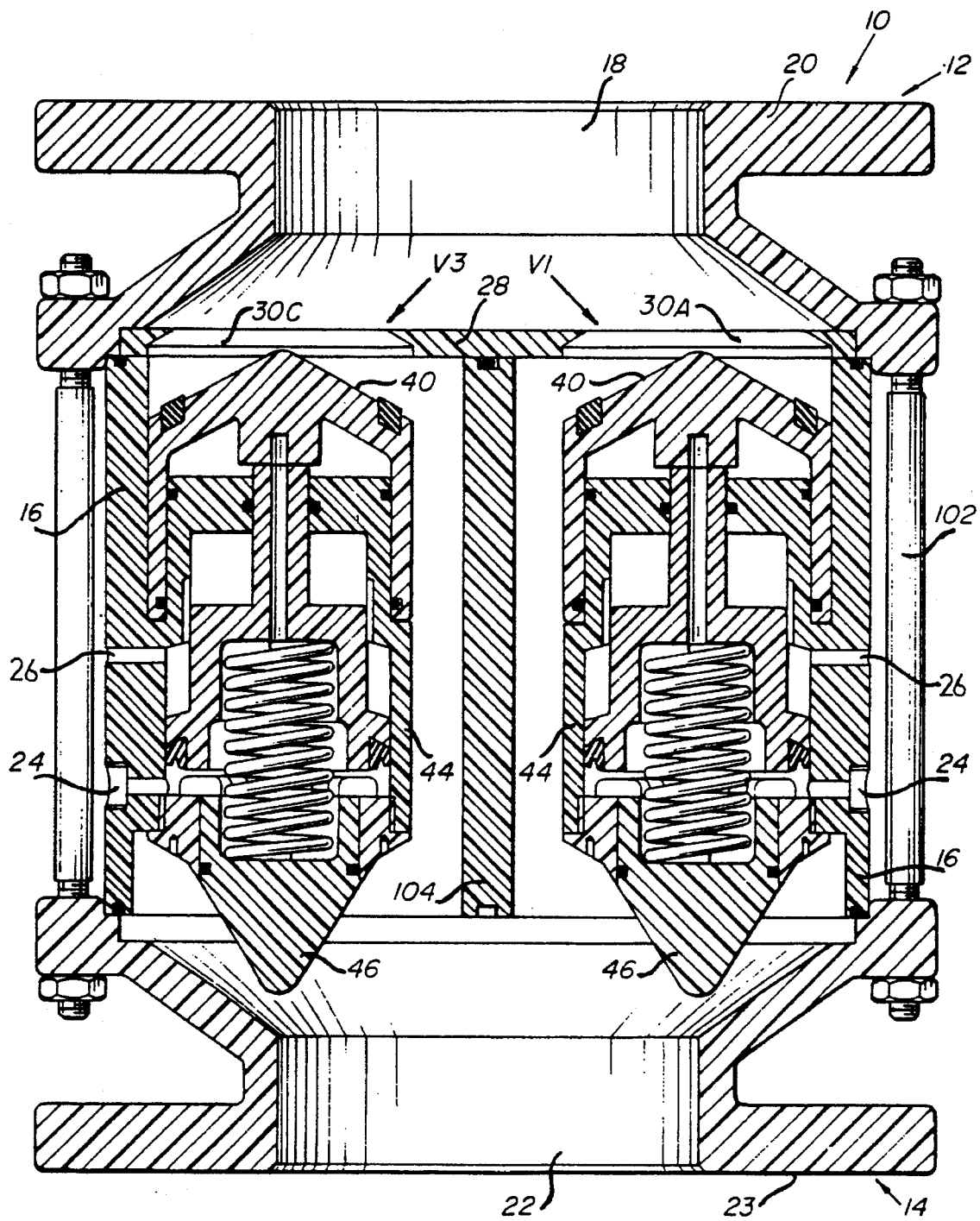
FIG. 3 is a cross-sectional view similar to FIG. 1 with the valve units in an open position.

It is thus noted that valve member 40 is reciprocable between a closed position shown in FIG. 1 and the open position of FIG. 3.

Fixed cylinder member 44 defines thereinside a first cylinder portion 72, a second cylinder portion 74, and a cylindrical guide surface 76 with seal 78.

Reciprocable within the cylinder 44 is the said first piston 42 which includes a first piston or plunger portion 80 with seal or gasket 82 co-operating with surface 72 of the cylinder 44; and a second piston portion 84 in sealed sliding contact with the said surface 74 of the cylinder 44, provided with seal 86.

An extended projected portion 88 of the piston 42 reaches through the bore 76 up to an abutment contact with surface 68 of the valve 40.

The piston 42 is hollow, namely it comprises a space 90 extended by bore 92 which becomes aligned with the bore 70 of the valve member 40.

A coil spring 93 is placed in the hollows of the pistons 42 and 46.

It will be thus noted that piston 42 is of the differential type, having three gradually-decreasing cross-sectional active areas defined by the surfaces 72, 74, and 76 of the cylinder 44.

The downstream end portion of the cylinder 44 constitutes a mounting for the second, fixed cylinder 48 with associated piston 46. The piston 46 is bullet-shaped pointed in the downstream direction and comprises a piston surface 94 co-operating with surface 96 of the cylinder 48 intermediate gasket 98. The piston 46 is hollow and provided with a flanged shoulder 100, preferably of a slotted structure as described in detail in our the above-cited U.S. Pat. No. 4,681,130.

As further described in U.S. Pat. No. 4,681,130, the valve is adapted to assume three modes of operation, namely as a check-valve, as a positively shuttable valve (by a pressure command admitted through control passage 24), and as a safety device against water-hammer effect, in the event of sudden pressure-drops upstream of the line. These details of operation need not be repeated in the context of the present invention and are hereby incorporated by reference.

For completing the structure of the device 10 into an integral, operable device, it is to be noted that the casing 16 is in fact a cylindrical body, except for the inwardly-directed cylinders 44, constituting the housings of the individual valves V1–V4, which are integrally moulded and carried by the inner surface of the cylindrical casing 16. The inlet flange 12 and the outlet flange 14 are fastened to each other at the opposite sides of the casing 16 by tie rods 102 extending around the casing 16, each rod having a screw thread at its ends whereby the flanges 20 and 14 are clamped to each other by nuts 103.

Casing 16 is thus divided into a number of compartments, one for each valve unit incorporated in the device i.e. four in the present embodiment. This division is attained by providing a unified a partition member 104 as best seen in FIG. 2, conveniently—though not necessarily —formed as an integral part of the casing 16 (and the cylinders 44).

The member 104 and the top of the casing 16 are properly sealed against the plate 28 by rubber seal 106 received in slot 108.

Figure 2:
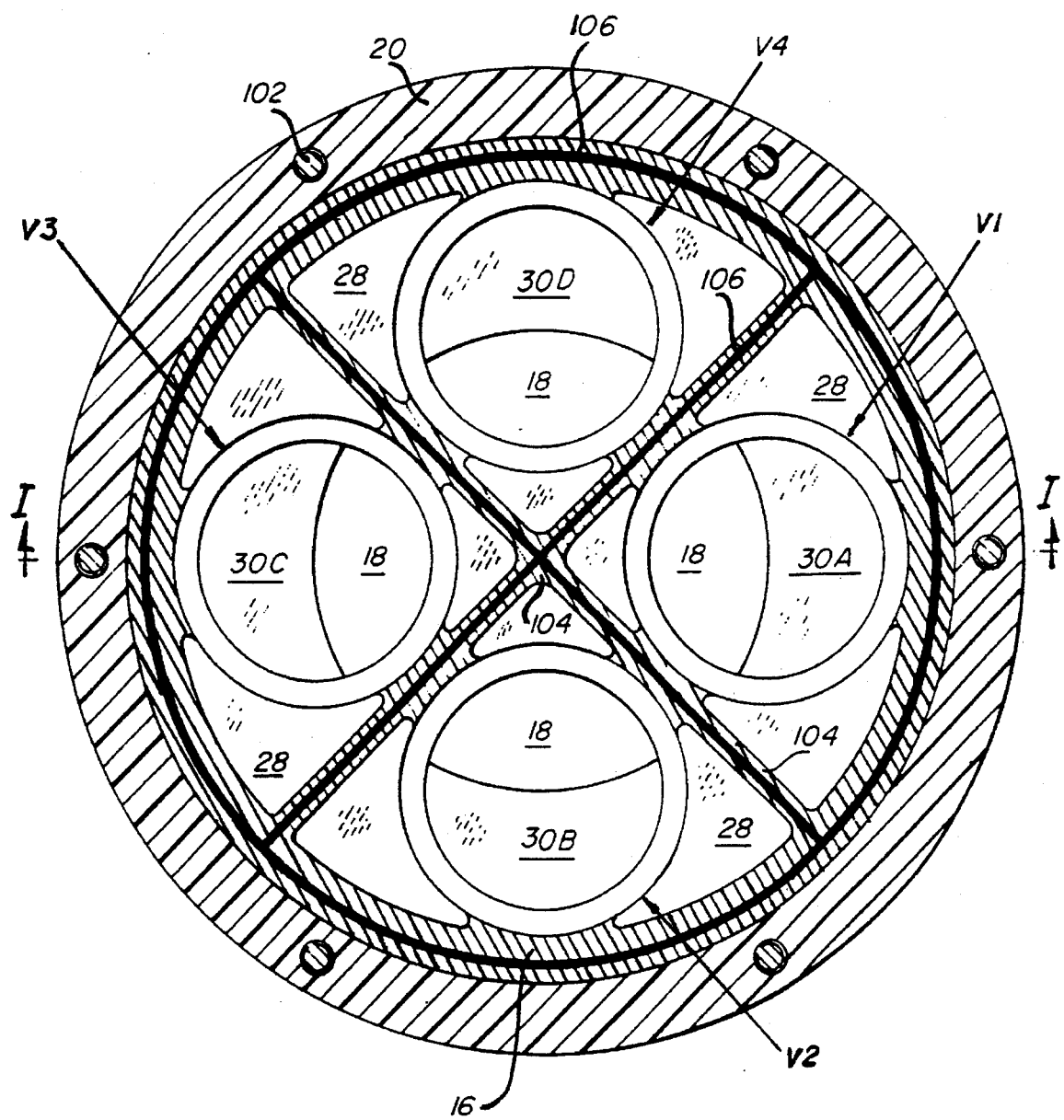
FIG. 2 is a view taken along line II—II of FIG. 1.

As seen particularly in FIG. 2, member 104 includes a plurality of partition members extending radially within the cylindrical casing 16 to define a plurality of compartments each having the cross-section of a sector of a circle. In this example, there are two such partition members disposed perpendicularly to each other, each having a width equal to the inner diameter of cylindrical casing 16, and a length equal to the length of the cylindrical casing, to thereby divide the interior of the casing into four compartments.

It will be noted that the bottom side of the member 104 and casing 16 may be provided with a slot 110 corresponding and opposite to the slot 108 of the seal 106, however no gasket is needed to be placed in the slot 110 since, in the present configuration no counterpart is installed at this, outlet side of the device (cf. FIG. 4 below).

It will be further noted that the flange 14 is provided at its upper side with a circular cavity 112 similar and symmetrically opposite to the cavity 32 that holds the plate 28.

FIG. 1 thus illustrates a first operable position of the flow control device 10, wherein the valves V1 and V3—as well as valves V2 and V4, which are not shown in FIG. 1—are closed by their respective valve members 40, such position being attained by admitting a suitable pressure command into the fixed cylinder 44 via the control port 24 of each one of the valves.

Figure 4:
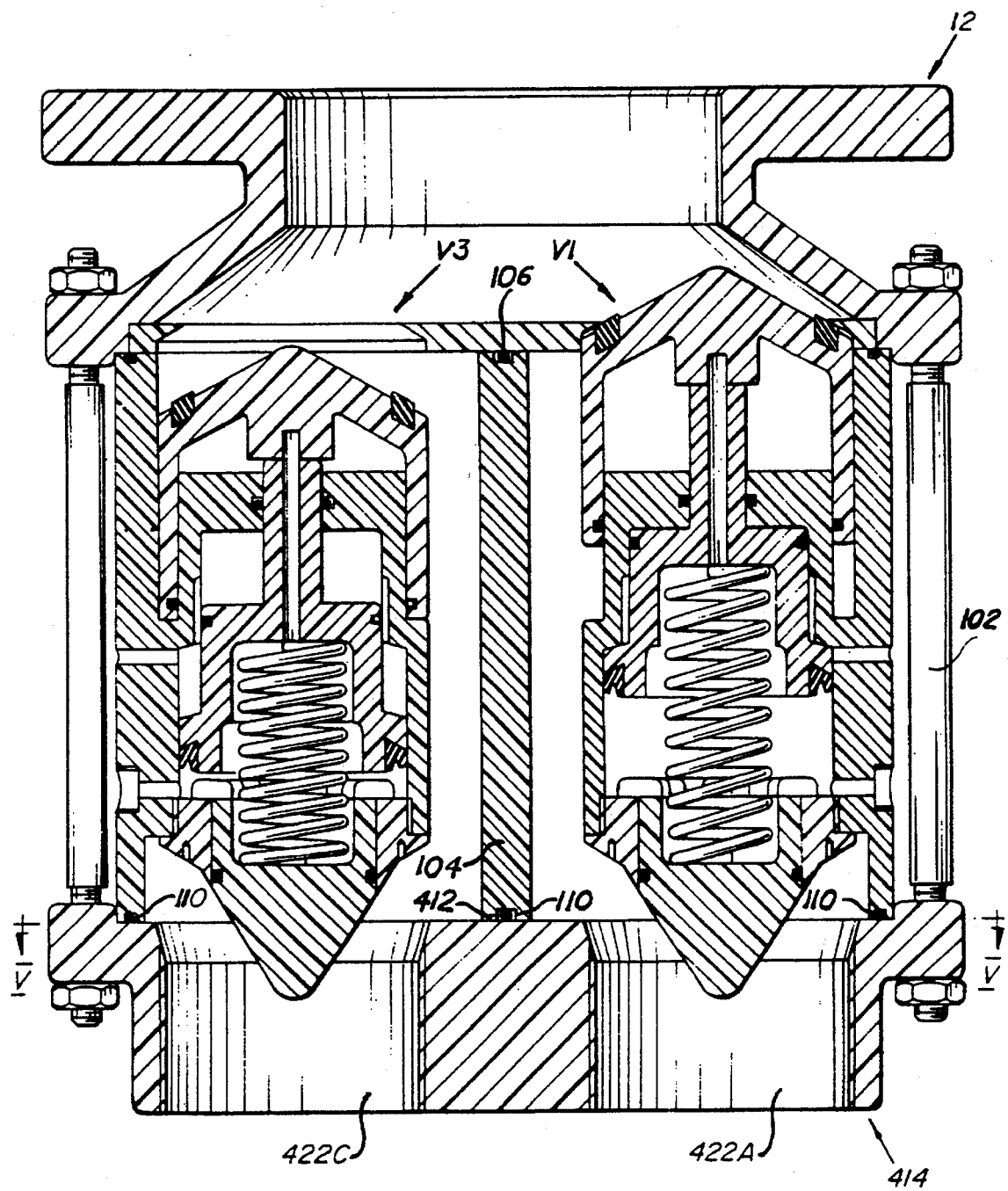
FIG. 4 shows the device of FIG. 1 with one of the valve units in a closed position and one in an open position.

The other obvious modes of operation are illustrated in FIGS. 3 and 4, namely that all the valves perform as check valves—or forward flow regulating valves—namely, remain open as long as incoming fluid pressure is maintained above an amount which can be set by the force of the coil-springs 93, and a hybrid position where one or more of the valves are positively closed, and one or more of the other valves are open, as shown in FIG. 4.

Figure 5:
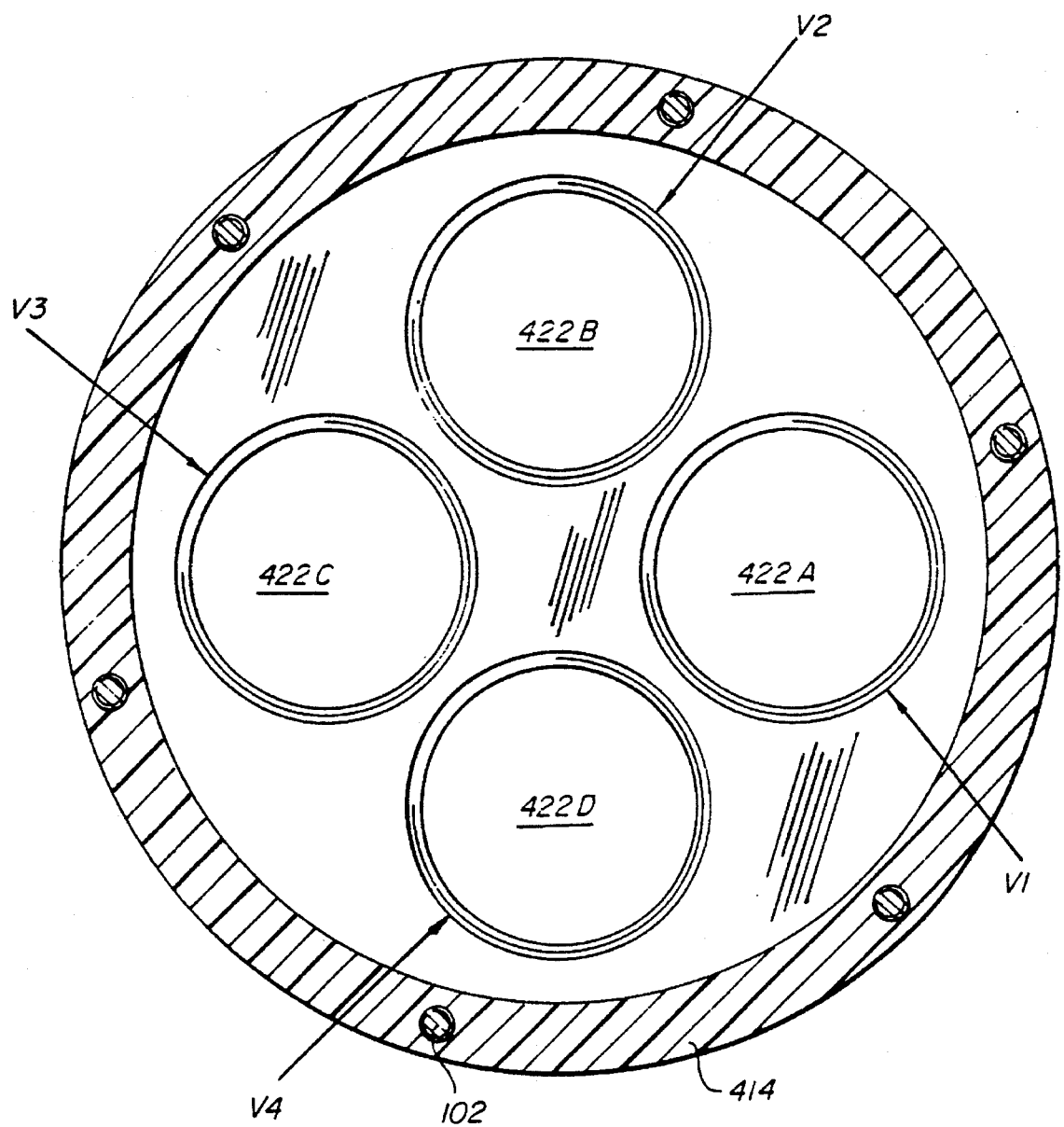
FIG. 5 is a view taken along line V—V of FIG. 4.
Figure 6:
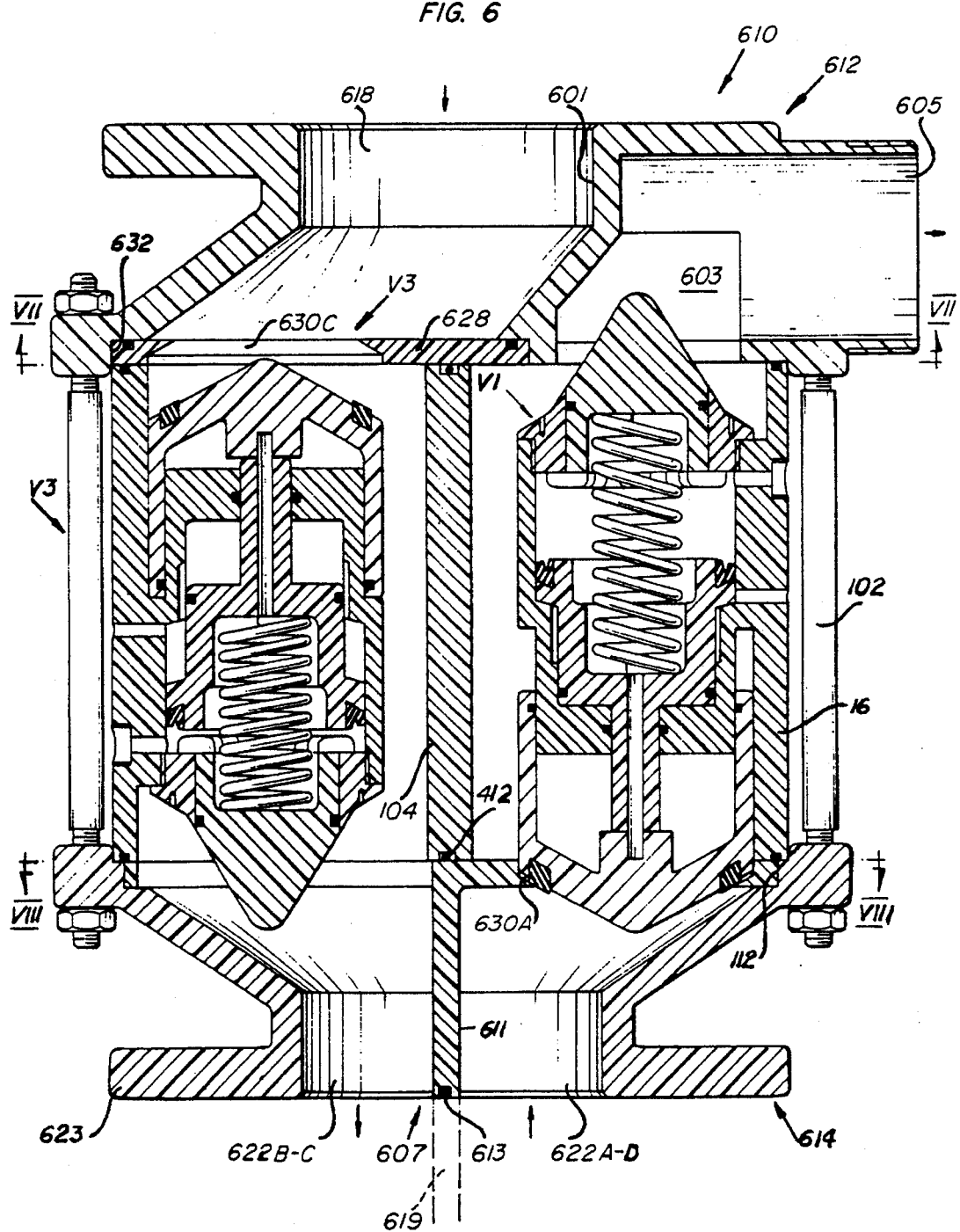
FIG. 6 is a cross-sectional view of the control device with one valve unit operating in the forward flow-direction and one in a reverse flow-direction.

In the last-mentioned configuration of FIG. 4, and according to a further aspect of the invention, the outlet flange 14 is substituted by a modified outlet fitting designated 414 which, as more clearly seen in FIG. 5, comprises individual outlet openings 422A, 422B, 422C, and 422D, for the valves V1–V4, respectively. The outlets 422 may be provided with screw threads for connecting thereto four individual consumers or, say, pipes leading to four different plots for satisfying the situations as above-described in the preamble of this specification, namely, rather than providing a manifold with four individual valves from every consumer.

It is for this reason that slot 110 was prepared in the 4-partition member 104, namely to enable sealing by a seal 412 against the upper flat surface of the flange 414.

Figure 7:
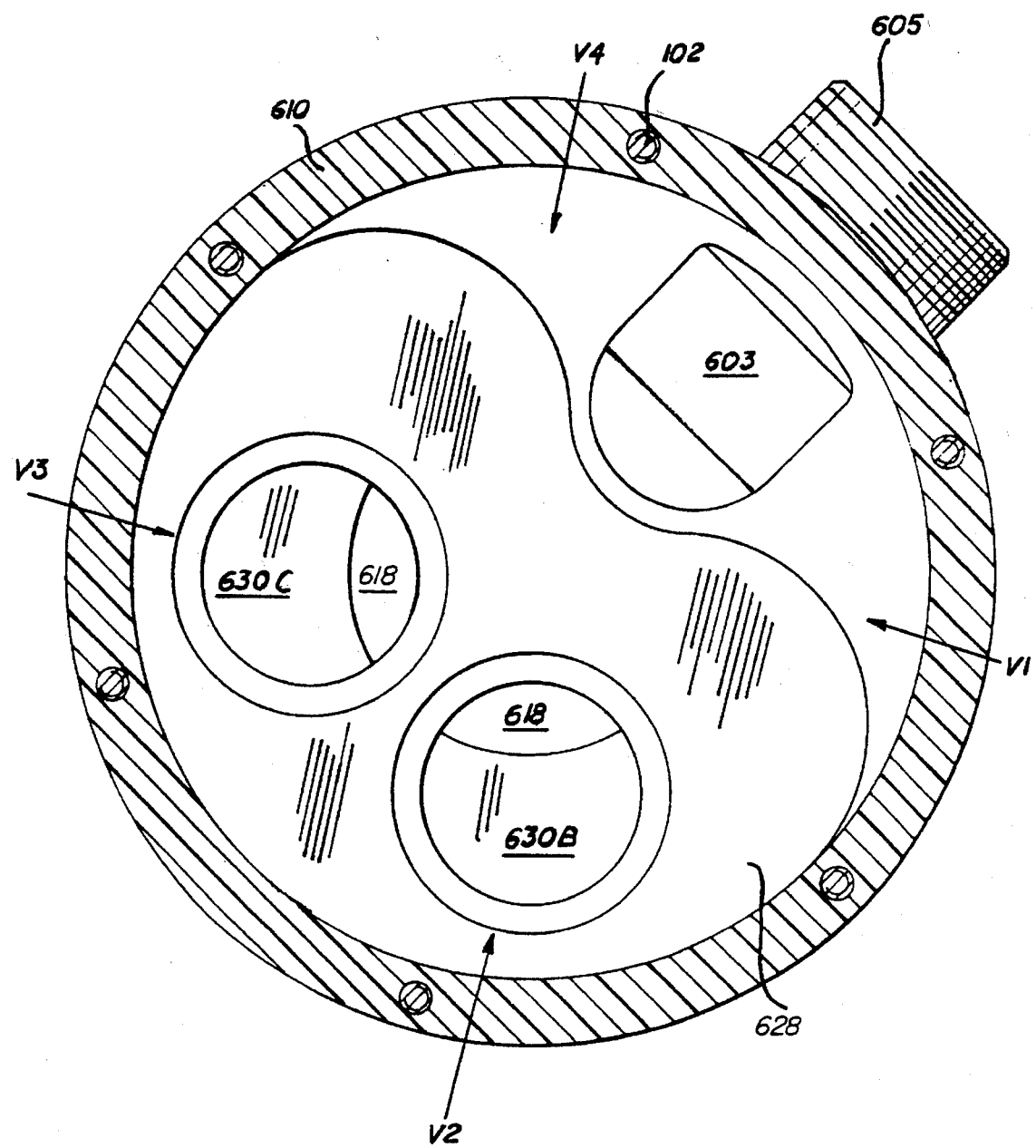
FIG. 7 is a section along line VII—VII of FIG. 6.

A still further aspect of the invention will now be discussed in conjunction with FIGS. 6–9. Hence, this embodiment is characterised in that some of the participating valves are mounted in an upside-down position, i.e. performing as reverse flow control valves from the outlet to the inlet sides of the device. In the described embodiment in which two forward (V2 and V3) and two reverse (V1 and V4) flow controlling valves are comprised (for a purpose to be described in conjunction with FIG. 9), the inlet flange 612 and the outlet section 614 have to be modified in the following manner: The plate marked 28 in the preceding embodiment is substituted by a kidney-shaped plate 628, having two openings 630B and 630C, as shown in FIG. 7. The plate 628 also serves as a valve-seat plate, corresponding to plate 28, but it does not completely cover the upper end of casing 16. Plate 628 is supported along its circular portion by the cavity 632 which served, in the preceding embodiments, to hold the said plate 28.

The inlets flange 612 is further divided by a partition 601 so that a common inlet port 618 is formed for the valves V2 and V3 and a common outlet port 603 formed in communication with a drain-pipe section 605 for the valves V4 and V1, both ports being integrally-formed in one plastic-moulded unified body.

Figure 8:
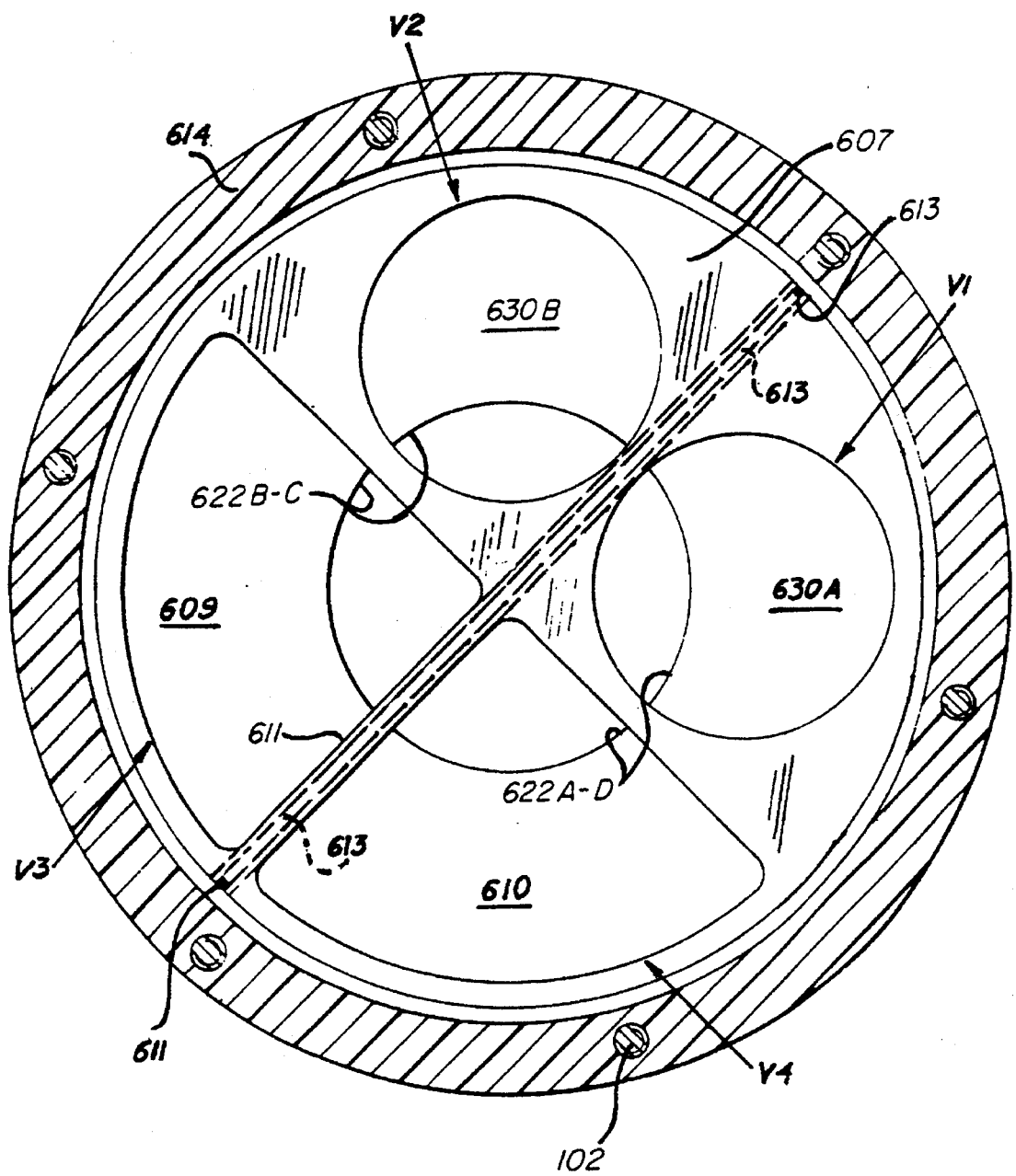
FIG. 8 is a section along line VIII—VIII of FIG. 6.

At the outlet side of the device 610, namely the flange 614, the following changes are made, as better seen in FIG. 8. An insert member 607 is placed between the flange 614 and the casing 16, fitting into the cavity 112. It comprises two triangular openings 609, 610 in direct extension of the valves V3 and V4 compartments. The other half of insert member 607 serves as a valve-seat plate formed with valve seats defining valve openings V1 and V2. A central, diametrically-extending rib 611 divides the outlet of the flange 614 into halves marked 622B–C and 622A–D. A seal 613 is provided all along the bottom and opposite sides of the rib 611.

Figure 9:
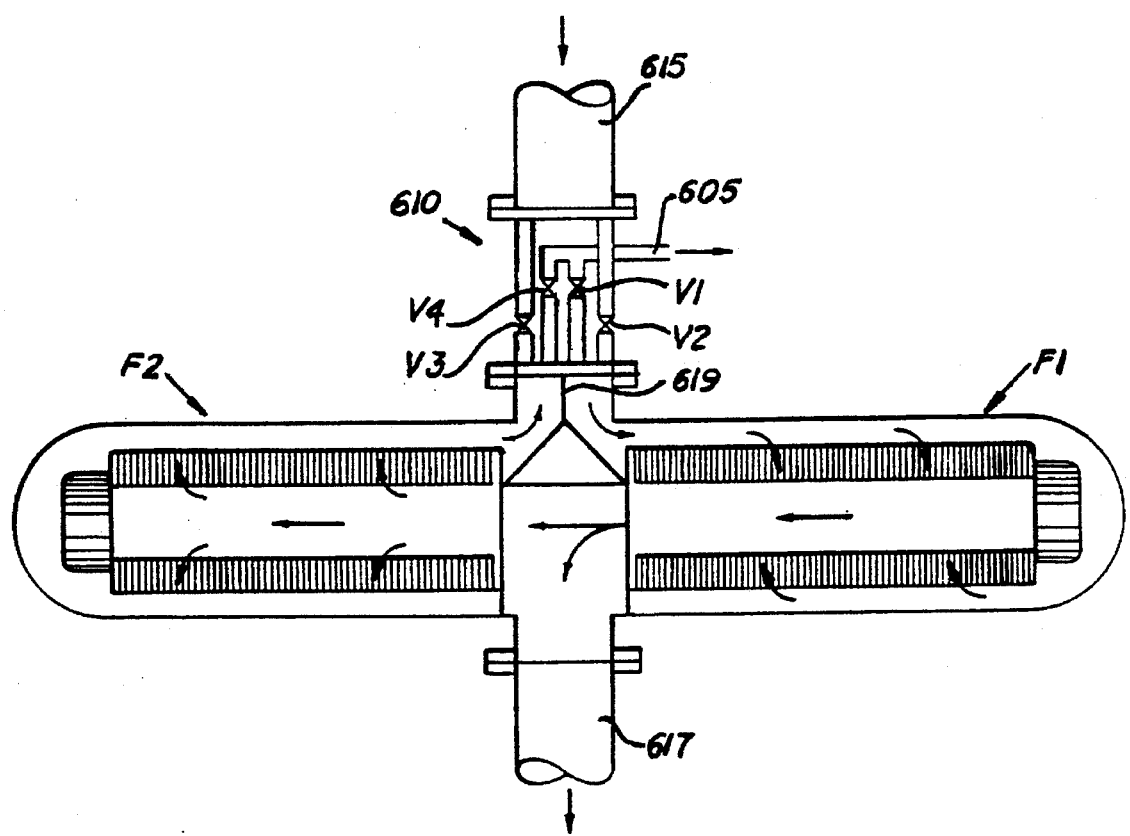
FIG. 9 illustrates the use of the control device of FIGS. 6–8 in the operation of a double-sided water irrigation disc filter.
Figure 10:
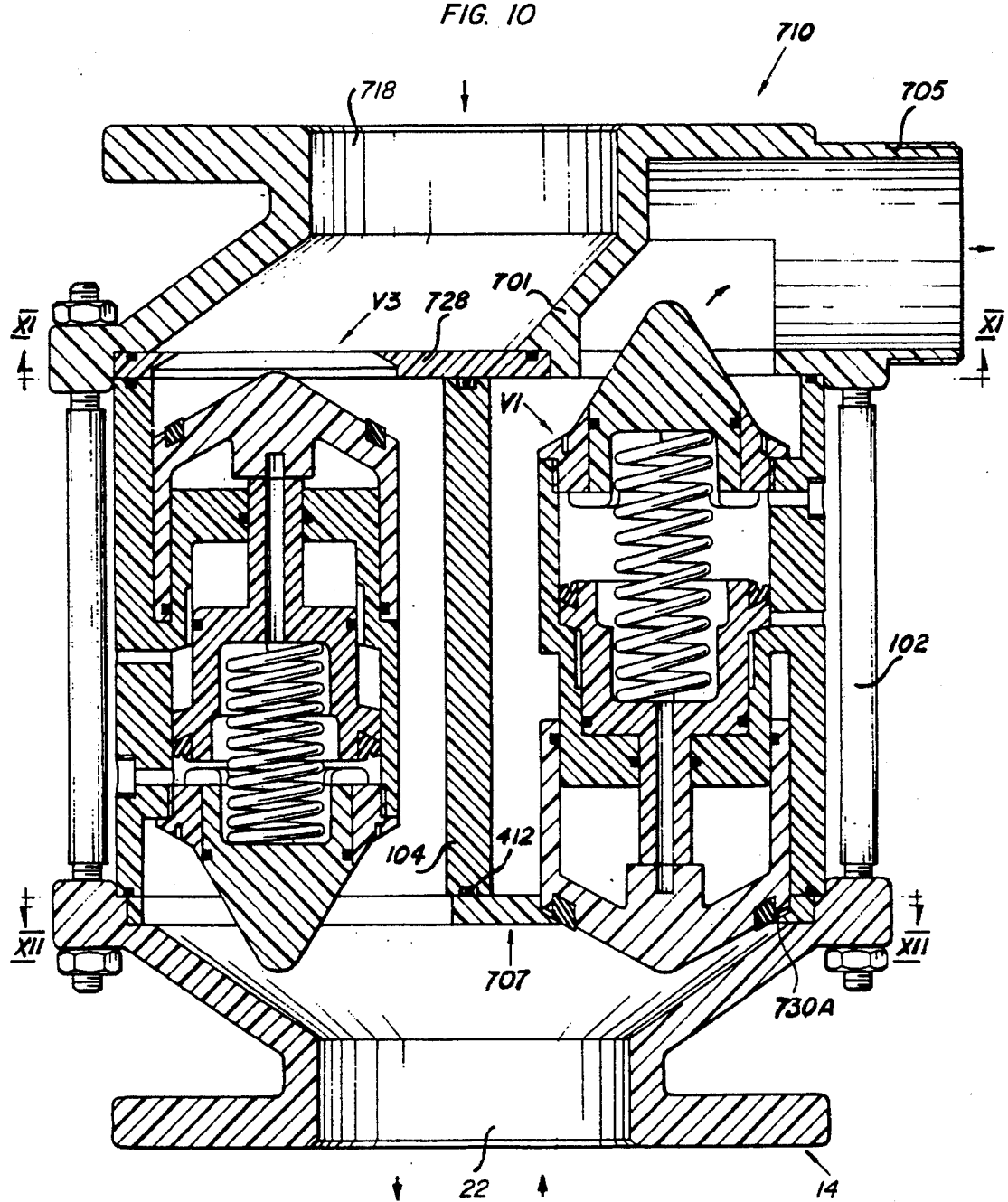
FIG. 10 is a cross-section similar to FIG. 6, but with a common, undivided outlet.
Figure 11:
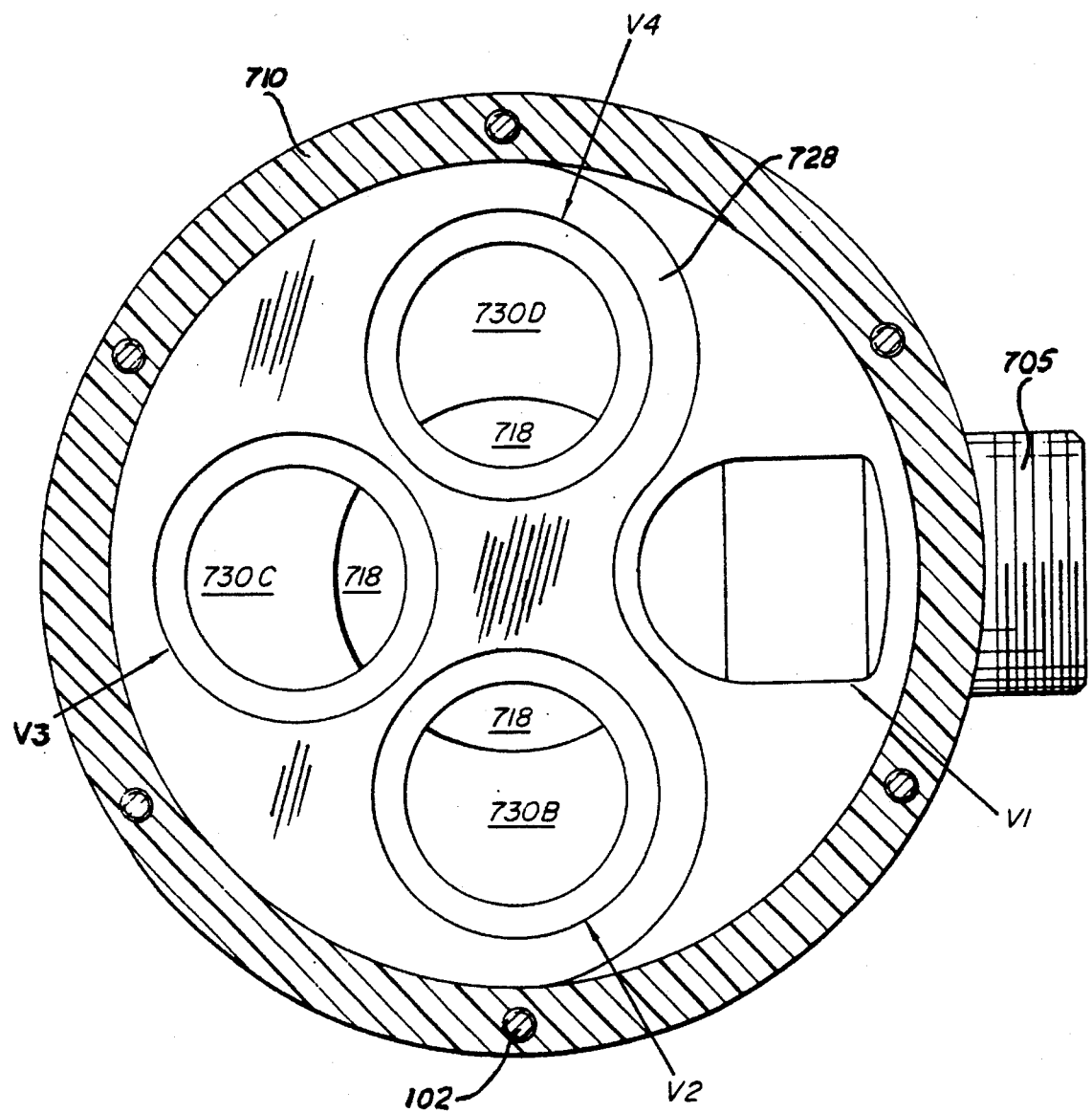
FIG. 11 is a view taken along line XI—XI of FIG. 10.
Figure 12:
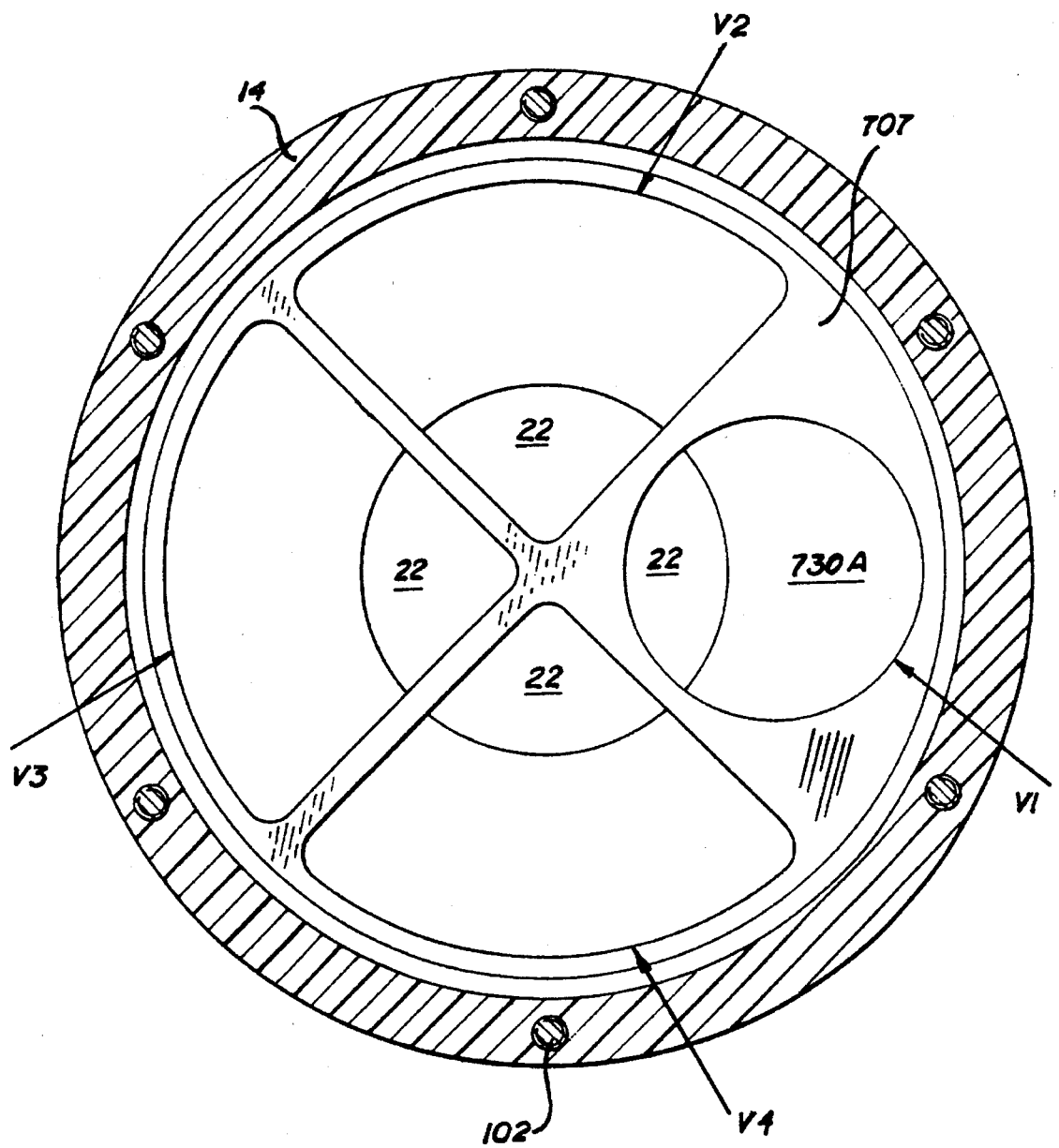
FIG. 12 is a section taken along line XII—XII of FIG. 10.
Figure 13:
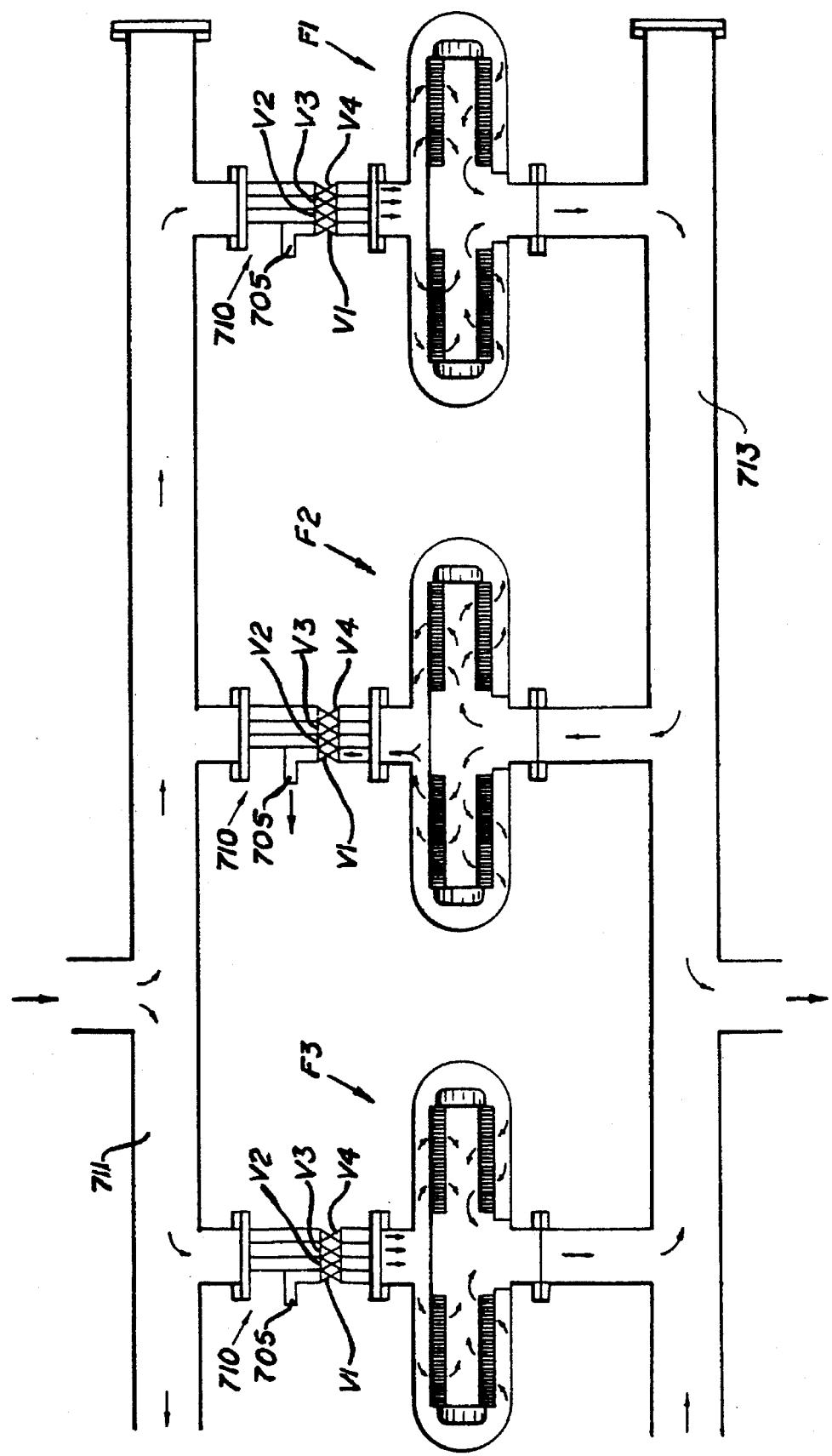
FIG. 13 illustrates the use of the device of FIGS. 10–12 in the operation of a battery of irrigation disc filters.

Now this particular configuration becomes most useful in the situation schematically shown in FIG. 9, namely where the device 610 is coupled and adapted to feed a pair of oppositely arranged disc filters of any known design, advantageously of the type disclosed in our U.S. Pat. No. 4,655,910.

As known, the filters, marked F1 and F2, need to be rinsed from time to time by back flush flow, namely from their inner surface in the outward direction, as marked by arrows with respect to the filter F2.

As described above, valves V2 and V3 are forward flow-control valves, whereas valves V1 and V4 are reverse flow-control valves. Hence, during normal operation of the filters F1 and F2, supply water to be filtered is admitted from main pipe 615 through valves V2 and V3, while the other two valves V1 and V4 are kept closed. Water will be filtered through both valves in the normal way and discharged through outlet 617.

For effecting a rinsing, back-flow cycle for filter F2, valves V1 and V3 are closed by proper pressure commands. Under these conditions, supply water will still be fed to the filter F1, however not to filter F2, which will now be communicated to the drain outlet 605 via the now self-opened valve V4. Valve V1 remains closed. Part of the filtered water will now tend to flow in the reverse direction regarding filter F2 to rinse same, and drain through valve V4 and drainport 603.

It will be noted that the partition 611 with seal 613 is mounted in a sealed manner on a partition 619 (also shown, in broken lines, in FIG. 6) which is provided at the opening of the double filter structure, separating both the inlet and the discharge of water from the inlet side of the filter system.

For rinsing the other filter F1, the same procedure will be applied with respect to different valves, namely closing valves V2 and V4, and allowing the opening of valve V1 under the pressure of the rinsing water.

In the further embodiment of the invention illustrated in FIGS. 10–13, there is provided one valve in the reverse flow-controlling direction—namely valve V1—while the three other valves V2–V4 are in the normal, forward flow-control direction. The inlet side of the device 710 is similar to that of FIG. 6, namely providing an outlet or drain-opening 705. However, for the three remaninig valves, a kidney-shaped plate 728 is provided with three openings 730B, 730C, and 730D.

At the bottom, outlet side an insert member 707 is included, similarly to the member 607 of the preceding embodiment, but comprising only one inlet port 730A for the reverse flow control valve V1, and no outlet dividing rib. The device thus provides three forward flow-control paths and one reverse flow-control path, which arrangement is most useful in the operation of filter systems F1, F2, and F3, connected in parallel between inlet header 711 and outlet header 713. The filters are shown to be of the double-sided type, however the arrangement is equally applicable to other types of filters.

During normal operation, namely filtering of water admitted through the header 711, valves V2, V3, and V4 are open and V1 is closed.

For back-flushing any one of the filters without disturbing the normal operation of the other filters, what is needed is only to close all the forward flow valves V2–V4 of the valve to be treated and allow the self-opening, check-valve function of the valve V1 to become effective. Consequently, a reverse flow will be developed in the respective filter, which will be drained through the valve V1 and outlet 705.

The same procedure will be effected with respect to any one of the filters which is to be periodically rinsed, the process being maintained with minimal disturbance to the overall filtering capacity of the system as a whole.

It has been thus established that a highly versatile flow control device is achieved, employing the basic construction of multiple valves integrally-mounted within a common housing. Especially in the four valve units version as above-described, it is most advantageous and lends itself to various uses that heretofore demanded a series of different control devices and valves to be incorporated in a complicated and costly manner regarding operation, maintenance, and control.

It goes without saying that various other types of valve units, other than the one related to the in-line valves disclosed in our U.S. Pat. No. 4,681,130, may be applied without altering in principle the use of the flow-control device. Hence, straightforward hydraulic or electric (solenoid) valves may be accommodated within a signal housing and controlled from outside in well-known manners.

Those skilled in the art will readily appreciate that many changes, modifications, and variations may be applied to the above-described preferred embodiments of the invention, without departing from its scope as defined in and by the appended claims.

What is claimed is:

1. A fluid flow control device, comprising:
   a casing;
   an inlet flange secured to one end of said casing and including an inlet port;
   an outlet flange secured to the opposite end of said casing and including an outlet port;
   a valve-seat plate secured between said inlet flange and said casing and formed with a plurality of valve seats each defining a valve opening leading into the interior of said casing;
   a plurality of partition members within said casing and engageable with inner surfaces thereof to divide the interior of said casing into a plurality of separate compartments including one compartment communicating with each of said valve openings;
   and a valve within each of said compartments communicating with a said valve opening, each valve including a valve member movable towards and away from the valve seat of the respective compartment to control the flow of fluid therethrough.

2. The device according to claim 1, wherein said casing is of cylindrical configuration, and said partition members extend radially within the cylindrical casing to define a plurality of compartments each having the cross-section of a sector of a circle.

3. The device according to claim 2, wherein there are two of said partition members disposed perpendicularly to each other, each having a width equal to the inner diameter of said cylindrical casing and a length equal to the length of said cylindrical casing, to thereby divide the interior of the cylindrical casing into four compartments.

4. The device according to claim 2, wherein said partition members are integrally formed with said casing.

5. The device according to claim 1, wherein said valve-seat plate completely covers the respective end of the casing and includes a valve seat defining a valve opening for each of said compartments.

6. The device according to claim 5, wherein said outlet flange includes a common outlet port for all said compartments.

7. The device according to claim 5, wherein said outlet flange includes a separate outlet port for each of said compartments.

8. The device according to claim 1, wherein said valve-seat plate covers only a part of the respective end of the casing and includes a valve seat defining a valve opening for each covered compartment, but leaves at least one of said compartments uncovered.

9. The device according to claim 8, wherein there is a second valve-seat plate, said second valve-seat plate being secured between the casing and the outlet flange and including a valve seat defining a valve opening communicating with each compartment not covered by said first-mentioned valve-seat plate; and wherein there is a valve within each compartment communicating with a valve opening in said second valve-seat plate, each latter valve including a valve member movable towards and away from the valve seat in said second valve-seat plate for the respective compartment to control the flow of fluid therethrough.

10. The device according to claim 9, wherein said inlet flange includes an inlet port communicating with one end of at least one compartment via a valve opening in said first-mentioned valve-seat plate, and an outlet port leading from each compartment communicating with a valve opening in said second valve-seat plate.

11. The device according to claim 10, wherein said casing is divided by said partition members into four compartments, two of said compartments communicating with the inlet port in the inlet flange via valve openings in said first-mentioned valve-seat plate, the remaining two compartments communicating with the outlet port in said inlet flange.

12. The device according to claim 10, wherein said casing is divided by said partition members into four compartments, three compartments communicating with the inlet port in the inlet flange via valve openings in said first-mentioned valve-seat plate, and the remaining compartments communicating with the outlet port in said inlet flange.

13. The device according to claim 1, wherein each of said valve assemblies includes a fluid actuator, and wherein said casing includes, for each valve, a control fluid passageway for an actuating fluid and a drain fluid passageway for draining the actuating fluid.

14. The device according to claim 13, wherein each valve includes a cylinder integrally formed with said casing and also formed with said control fluid passageway and said drain fluid passageway, and wherein said movable valve member of the respective valve is carried by a piston movable with respect to said cylinder.

15. A fluid flow control device, comprising:
   a casing;
   an inlet flange secured to one end of said casing and including an inlet port;
   an outlet flange secured to the opposite end of said casing and including an outlet port;
   a valve-seat plate secured between said inlet flange and said casing and formed with a plurality of valve seats each defining a valve opening leading into the interior of said casing;
   a cylinder integrally formed with said casing for each of said valve openings;
   a piston movable with respect to each of said cylinders;
   a valve member carried by each of said pistons and movable towards and away from the respective valve seat for closing and opening the respective valve opening;
   an actuator fluid passageway for each of said cylinders and passing through said casing and the respective cylinder;

and a fluid drain passageway for each of said cylinders and passing through said casing and the respective cylinder.

16. The device according to claim 15, wherein the interior of said casing is divided into a plurality of separate compartments by a plurality of partition members within the casing engageable with the inner surfaces of the casing; said plurality of separate compartments including one compartment communicating with each of said valve openings.

17. The device according to claim 16, wherein said casing is of cylindrical configuration, and said partition members extend radially within the cylindrical casing to define a plurality of compartments each having the cross-section of a sector of a circle.

18. The device according to claim 17, wherein there are two of said partition members disposed perpendicularly to each other, each having a width equal to the inner diameter of said cylindrical casing and a length equal to the length of said cylindrical casing, to thereby divide the interior of the cylindrical casing into four compartments.

19. The device according to claim 15, wherein said valve-seat plate completely covers the respective end of the casing and includes a valve seat defining a valve opening for each of said compartments.

20. The device according to claim 15, wherein said valve-seat plate covers only a part of the respective end of the casing and includes a valve seat defining a valve opening for each covered compartment, but leaves at least one of said compartments uncovered.

* * * * *